(12) United States Patent
Tsukamoto et al.

(10) Patent No.: US 6,900,410 B2
(45) Date of Patent: May 31, 2005

(54) LASER WELDING PROCESSED

(75) Inventors: Susumu Tsukamoto, Ibaraki (JP); Isao Kawaguchi, Ibaraki (JP); Goro Arakane, Ibaraki (JP); Hiroshi Honda, Ibaraki (JP)

(73) Assignees: National Institute for Materials Science, Ibaraki (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 110 days.

(21) Appl. No.: 10/240,166

(22) PCT Filed: Sep. 5, 2001

(86) PCT No.: PCT/JP01/07703

§ 371 (c)(1),
(2), (4) Date: Jun. 4, 2003

(87) PCT Pub. No.: WO02/060634

PCT Pub. Date: Aug. 8, 2002

(65) Prior Publication Data

US 2004/0026381 A1 Feb. 12, 2004

(30) Foreign Application Priority Data

Feb. 1, 2001 (JP) ........................................ 2001-025954
Mar. 16, 2001 (JP) ........................................ 2001-077298

(51) Int. Cl.[7] ............................................. B23K 26/20
(52) U.S. Cl. .............................. 219/121.62; 219/121.64
(58) Field of Search ............ 219/121.6, 121.61–121.66, 219/121.83, 121.85

(56) References Cited

U.S. PATENT DOCUMENTS

6,410,882 B1 * 6/2002 Okada ................... 219/121.64

FOREIGN PATENT DOCUMENTS

| EP | 1075891 | 2/2001 |
| JP | 7-124772 | 5/1995 |

OTHER PUBLICATIONS

Isao Kawaguchi, et al., "Shin–Tokekomi Yosetsubu de Hassei sura Porosityno Teigen"; Dai–Shutsuryoku $CO_2$ Laser Yousetsu Gensho ni kansuru Kenkyu (Dai 2 hou), Yousetsu Gakkai Zenkoku Taikai Kouen Gaiyou–Dai 66 shuu–, Zaidan Houjin Yousetsu Gakkai, pp. 48 to 49, Mar. 2000.

T. Klein et al., "Forced oscillations of the keyhole in penetration laser beam welding", Journal of Physics, D. Applied Physics, The Institute of Physics, 1996 (96), vol. 29, pp. 322 to 332.

* cited by examiner

Primary Examiner—Samuel M. Heinrich
(74) Attorney, Agent, or Firm—Wenderoth, Lind & Ponack, L.L.P.

(57) ABSTRACT

In a laser welding method, occurrence of weld defects is effectively prevented, and a high-quality weld joint is provided, and in addition, a wide range of material processes including a laser-using de p-penetration welding technique can be implemented.

In keyhole welding using a laser performing output pulse modulation, the welding is conducted in accordance with a frequency conforming to a natural frequency of a metal molten pool.

8 Claims, 8 Drawing Sheets

(a) CW WELDING (b) PULSE WELDING
    EMPLOYING WAVEFORM CONTROL

LASER WELDING PROCESSED

TECHNICAL FIELD

The present invention relates to a laser welding method using a laser processor; more specifically, the invention relates to a new laser welding method capable of efficiently preventing weld defects in laser welding by introducing periodic waveform-controlled output variations to a pulse output to thereby activate a periodic flow of molten metal.

BACKGROUND ART

In recent years, the development has rapidly progressed in the technology for increasing the output capacity of a laser oscillator, and the technology is expected to be applied to deep-penetration/high-speed welding.

In this environment, the inventor has conducted studies and researches regarding low-heat-input/deep-penetration welding using a high-output-laser as an object of building a strong and tough structure.

The most significant problems arising when achieving the aforementioned object is that the difficulty increases in maintaining a keyhole stable b cause of an increas in the large p netr tion depth, and the possibility of causing defects such as porosities, blowholes, and cracks is thereby increased.

As a result, the inventor obtained knowledges that phenomena occurring at the keyhole and around the keyhole need to be appropriately controlled to prevent the aforementioned defects.

To find a means for implementing the above, the inventor conducted studies and researches regarding influences of a pulse waveform and a ratio between a peak output and a base output on the prevention of the defects. Then, the inventor found that when the flow of molten metal is controlled by introducing modulation to a laser output in accordance with an appropriate frequency and a waveform, the weld defects can significantly be reduced.

For example, as a pulsed-arc welding method employing control of the waveform of output variations, there is a method intended to prevent defects such as blowholes, cracks, and spatter by using a YAG laser. However, since a molten-pool natural oscillation frequency is not used for the frequency of the output variations, the frequency of the output variations does not activate the periodic flow of molten metal and is not sufficient to prevent defects in the de p-p n tration welding.

There is another method int nded to pr v nt porosities that can occur in a zinc-plated steel sheet. However, also in this case, defects occur according to a completely different occurrence mechanism of defects that are caused due to a high vapor pressure of zinc, and the object material and the penetration depth are peculiar.

Accordingly, an object of the present invention is to provide a new laser welding method according to knowledges obtained by the inventor, with which the problems occurring with the conventional techniques are solved, occurrence of melt defects is prevented, a high-quality weld can thereby be provided, and the laser-using deep-penetration welding technique can be used in a wide range of material processes.

DISCLOSURE OF INVENTION

To solve the problems described above, first, the present invention provides a laser welding method characterized in that, while performing keyhole welding by a laser whose output is pulse-modulated, the output of the laser is periodically varied with a frequency which conforms to a natural oscillation frequency of a metal molten pool.

Second, the present invention also provides a laser welding method as described above, characterized in that the welding is conducted by a $CO_2$ laser.

Third, the present invention provides a laser welding method characterized in that, while performing keyhole welding by a laser, a pulse output of the laser is periodically varied with a frequency conforming to a natural oscillation of a molten pool and a rise variation of a laser output is sloped. Fourth, the present invention provides a laser welding method characterized in that a fall variation of a laser output is sloped. Fifth, the present invention provides a laser welding method characterized in that both of the rise variation and the fall variation of the laser output is sloped.

Sixth, the present invention further provides a laser welding method, characterized in that one of the methods described above is employed, and a ration (WB/WP) of a bass output (WB) and a peak output (WP) is set to 0.6 or lower.

According to the present invention as described above, in the keyhole welding using a laser processor, weld defects such as porosities, blowholes and cracks can be efficiently prevented by introducing laser output variations with a frequency which conforms to a natural oscillation of a molten pool and a controlled waveform to thereby activate the p riodical flow of molten metal.

Figure 1:
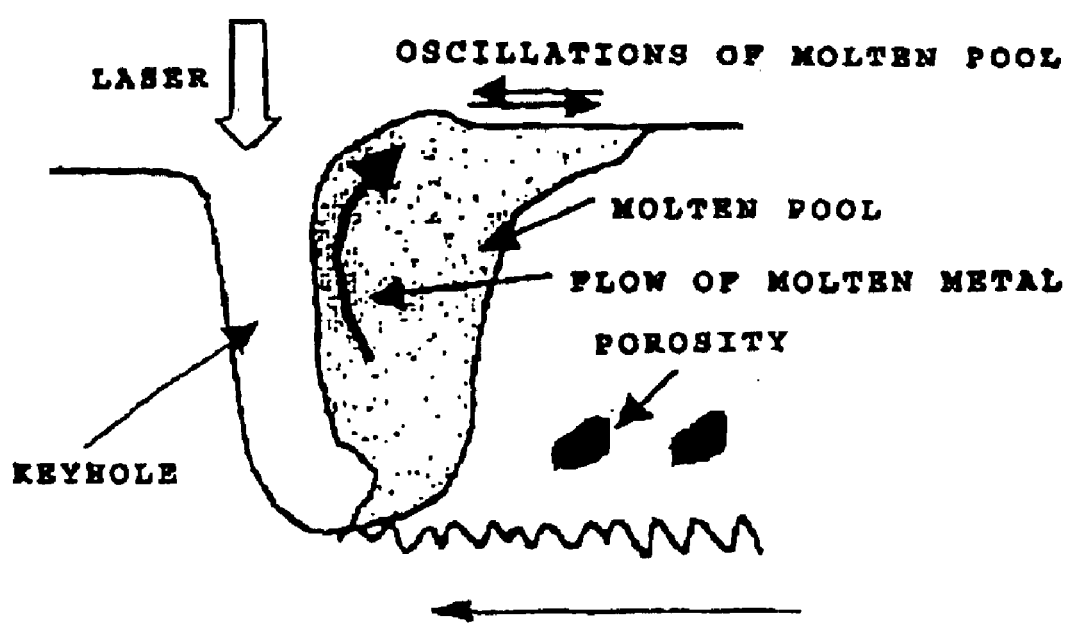
FIG. 1 is an explanatory overview of a keyhole laser welding.

Reference symbols in the drawings represent the following:

tu: rise time
tp: peak output time
td: fall time
tb: base output time
WP: peak output WB: base output Pr: defect occurrence ratio

BEST MODE FOR CARRYING OUT THE INVENTION

The present invention has features as described above; and hereinbelow, embodiments thereof will be described.

First, the present invention is characterized in that, in keyhole welding, weld defects such as porosities, blowholes, and cracks are efficiently prevented by modulating a laser output in accordance with a frequency that conforms to molten-pool natural oscillations.

Roughly speaking, for example, as shown in FIG. 1, when welding is performed using a laser, as tb pen tration depth increases, the difficulty increases in stably forming a keyhole, thereby increasing the probability in occurrence of weld defects such as porosities (pores). As exemplified in FIG. 2 as well as FIG. 3, in the above-described keyhole welding, when welding is performed using a pulse-modulated laser beam having an output shown in FIG. 2, a large amount of molten metal splashes out from the inside of the keyhole (FIG. 3(b)) with intense plasma generation when a pulse rises (ti in FIG. 2 and FIG. 3(a)). The splashed out molten metal moves as wave motion on the surface of the molten pool toward the rear end (FIG. 3(c)), r flects therefrom (FIG. 3(d)), and returns to the k yhole (FIGS. 3(e) and 3(f)). In connection with the movement of the molten metal, according to the present invention, the varying frequency of the output is controlled to conform to the frequency of the periodic motion of the molten pool, i.e., the natural oscillation frequency of the molten metal. According to this arrangement, the flow of the molten metal can be activated by resonance of the m lten pool, and the above-described weld defects can be prevented thereby. When periodic output oscillations are generated in accordance with a r sonant frequency of the molten metal, they can be implement d not only with th rectangular pulse but also with any other waveforms.

As is apparent from the above description, in the present invention, the "natural frequency of the metal molten pool" refers to the frequency of the reciprocation motion of the wave occurring on the surface of the molten metal. As such, according to the present invention, in the laser welding with the output-pulse-modulated laser beam, the pulse laser utput is controlled to conform to the frequency of the reciprocation motion and is thereby periodically varied.

Conventionally, there are known methods such as those represented by YAG laser welding intended to prevent weld defects such as porosities, cracks, and spatter in accordance with laser output variations. However, there are no other known methods than the present invention that has been developed with attention paid to the natural oscillations of the metal molten pool, in which the output variations in the frequency that conforms to the frequency of the natural oscillations are used to prevent weld defects.

There is another known method intended to prevent porosities that can occur in a zinc-plated steel sheet. However, also in this case, defects occur according to a completely different occurrence m chanism of d fects that are caused due to a high vapor pressure of zinc from th object defect ccurence mechanism of the present invention. Accordingly, the prevention technique in this method is essentially different.

As a matter of course, the present invention do s not specifically limits the types of welding-target materials and welding materials; that is, the pr sent invention is important as a basic technique of the laser-using keyhole welding. In addition, also the laser oscillator may be of an arbitrarily type as long as the output thereof can be pulse-modulated.

In particular, with a $CO_2$ laser being used for the high-output laser, the present invention is suitably applied to high-quality deep-penetration welding.

In a practical welding operation, through observation of the movement of the wave occurring on the surface of the molten metal, the frequency of the pulse modulation of the laser output may be c nformed in situ to the natural oscillation frequency of the molten metal. Alternatively, the pulse frequency of the laser output may be set to a frequency preliminarily verified for the conformity.

Next, a description will first be made regarding effects of a pulse waveform, a base output (WB), and th like on the por sity contr l under conditions where f r example , a peak output (WP), a defocus distance, shielding-gas conditions, and a welding speed are set constant. Subsequently, a description will be made regarding, for example, influences of a pulse rise time (tu) and a pulse peak output time (tp) on porosity occurrence.

Figure 4:
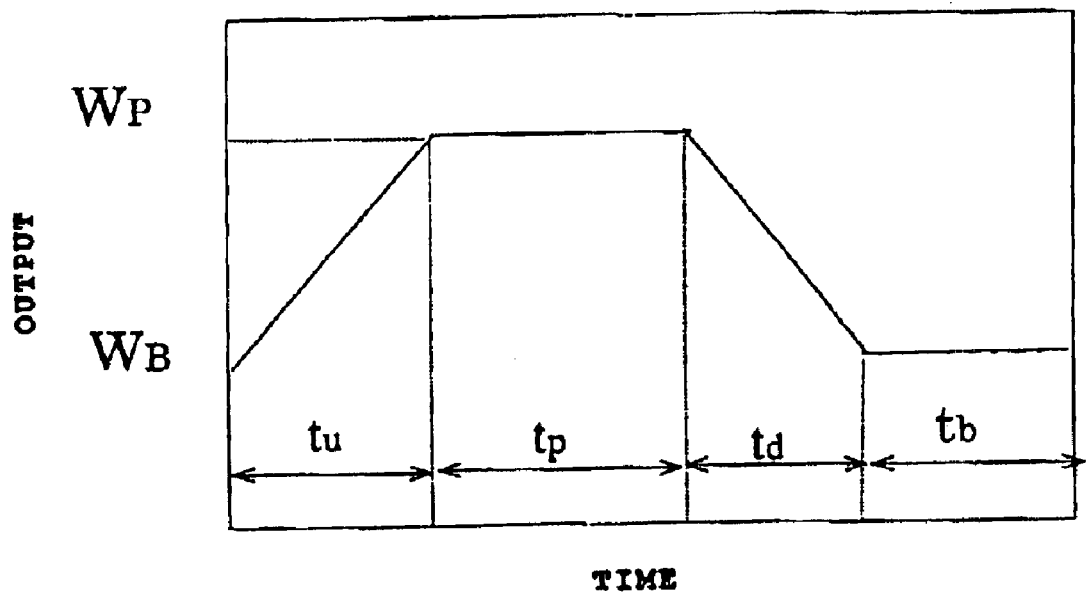
FIG. 4 is a view showing an example output waveform used to prevent defects.

Defects can be controlled by individually controlling the output frequency as well as a pulse rise time (tu), a peak output time (tp), a pulse fall time (td), a base output time (tb), a peak output (WP), and a base output (WB) that are shown in FIG. 4, as follows:

(a) The pulse frequency of the laser output is controlled to conform to the molten-pool natural oscillation frequency. An example pulse waveform in this case is shown in FIG. 1. According to the conformity between the molten-pool pulse frequency and the molten-pool natural oscillation frequency, the periodical flow of the molten metal can be activated.

(b) A ratio (WB/WP) between the base output (WB) and the peak output (WP) is reduced as much as possible to increase the amplitude of the molten-pool oscillation. Thereby, the periodical flow of the molten metal can be activated.

(c) In connection with the pulse rise time (tu), when WB/WP is reduced, the pr bability of spatter occurr nce at the time of an abrupt output variation is increased.

In addition, when the rise slope is excessively reduced, since the periodic flow is slowed, tu needs to be reduced to a level at which spatter does not occur.

(d) In connection with the pulse fall time (td), according to the variation from the base output (WB) to the peak output (WP), the keyhole size is abruptly reduced. As such, a slope needs to be provided to the fall to prevent occurrence of d fects attributed to abrupt flow of the molten metal into the keyhole. The pulse fall time (td) is preferably set to a time sufficient to prevent the aforementioned defects.

(e) In connection with the peak output time (tp), when tp is excessively long, intermittent splashing occurs during tp (peak output time). Thereby, the periodic flow according to the output variations is caused turbulent. As such, tp is preferably set to a short time in which intermittent splashing does not occur.

In ordinary CW (continuous wave) welding, intermittent splashing of molten metal from a keyhole is caused in a natural manner due to a random frequency.

(f) In conn ction with the bas output time (tb), sinc the r sponse of m lten metal to output variations is not fast, when tb is excessively short, the amplitude of the molten-metal oscillation introduced according to output variations is reduced. As such, a time that does not influence the amplitude needs to be set.

The present invention is configured to incorporate the above. The "slope" in the present invention represents the state of output variations with respect to the time in the case where the output is directly changed from the base output (WB) t the peak output (WP) or oppositely from the peak output (WP) to the bass output (WB) or in the case where the output is substantially linearly changed therebetween.

Hereinbelow, the invention will be described in more detail with reference to embodiments. As a matter of course, the embodiments described below to not limit the present invention.

EXAMPLES

Example 1

Partial penetration welding was performed on a steel plate SM490C which is for general welded structure by using a pulse-modulated $CO_2$ laser beam. A He gas was used as a shielding gas, and side-shielding was perform d at a flow rate f 50 L/min.

Figure 2:
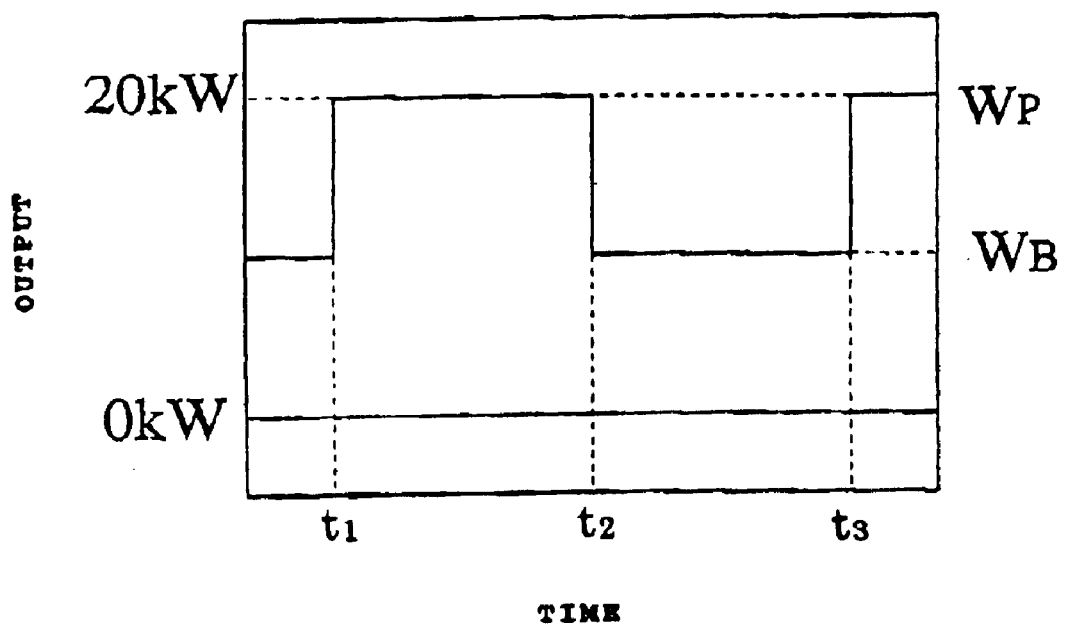
FIG. 2 is a view showing an example output waveform used in an embodiment. In the figure, WP represents a peak output, and WB represents a base output.
Figure 5:
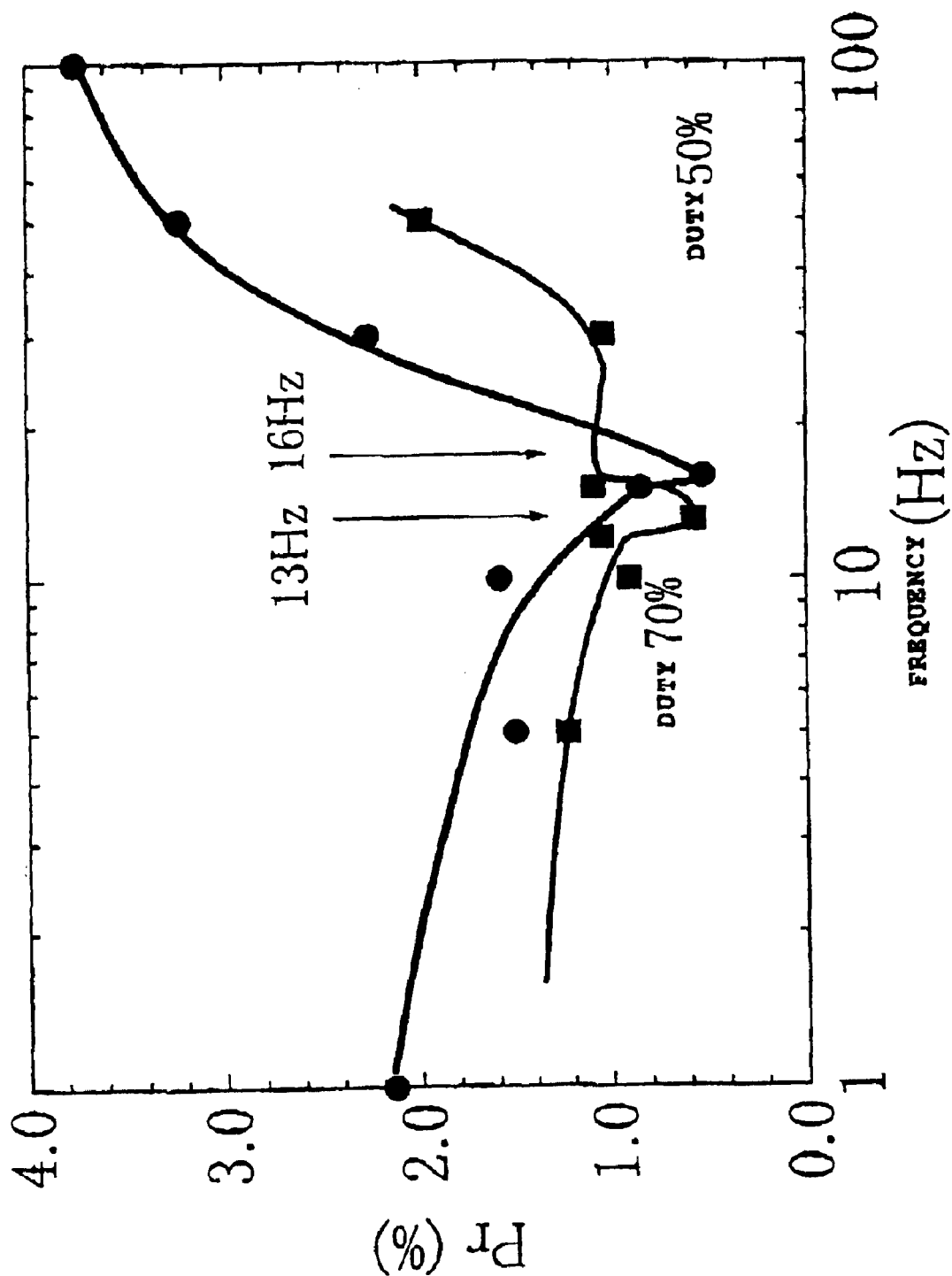
FIG. 5 shows the relationship between the frequency and the porosity occurrence ratio, and indicates that the porosity occurrence ratio is lowest at a resonant frequency. In the figure, Pr represents the defect occurrence ratio (ratio (%) of the sum of detected defect areas to the area of weld metal).

A r ctangular waveform as shown in FIG. 2 was us d for the output waveform; and the peak output WP was set to 20 kW, and the base output WB was set to 12 kW. Two types of duty cycles, namely a 50% duty cycle and a 70% duty cycle, were selected; and bead-on-plate welding was performed at various frequencies. Weld-defect detection was performed by x-ray examinations with radiation emitted perpendicular to a laser beam axis and a weld line from a sideface of a weld test piece. The ratio (%) of the sum of detected defect areas to the area of molten metal is defined as a defect occurrence ration Pr, and defect suppression effects were evaluated according to Pr. FIG. 5 shows the results of Pr m asurements performed at various frequencies. The defect suppression was most effective at 16 Hz with the 50% duty cycle and at a frequency of 13 Hz with the 70% duty cycle.

Figure 3:
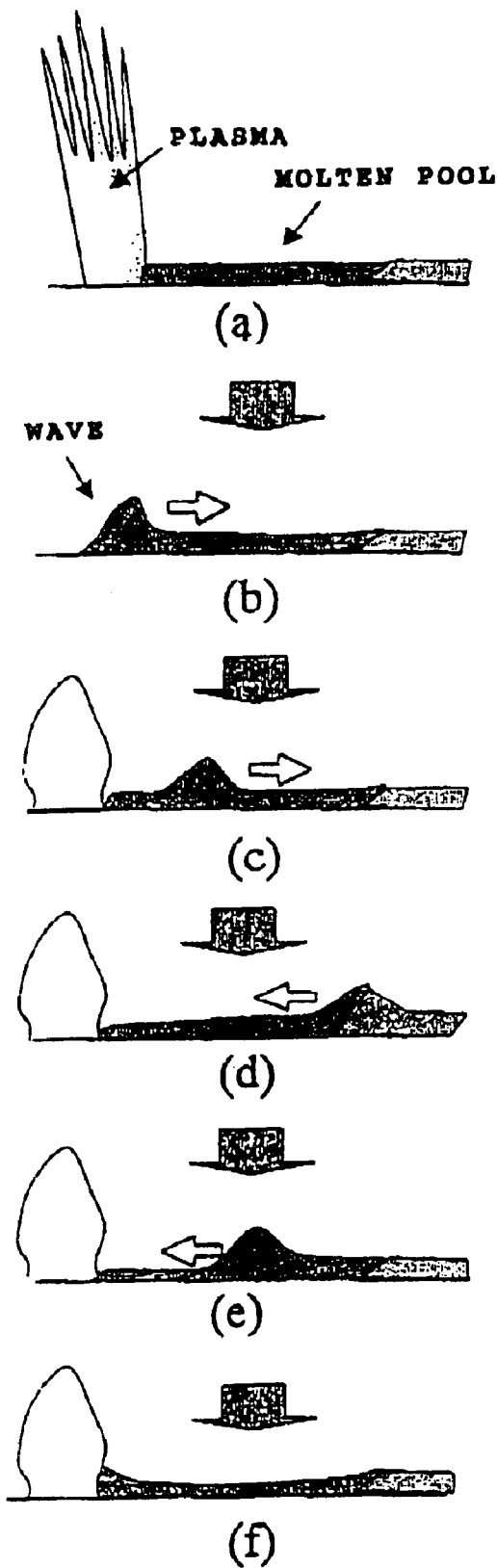
FIG. 3 is a schematic view showing the behavior of a molten pool.

During the welding performed under these conditions, the inventor observed the movement of th surface of the molten pool through a high speed camera. As a result, the inventor observed a phenomenon in which, as shown in FIG. 3, a wave occurred when the laser output rose from the base output WB to the peak output WB proceeded toward the rear end of the molten pool, reflected from the rear end, and then returned to the k yh le. The p ri dic wave motion, namely, a frequ ncy f of natural oscillations, can be expressed by the following expression, where the molten-pool length is r presented by L, and the wave speed (welding speed) is represented by V:

$$f = V/2L \quad (1)$$

Table 1 shows the value of f obtained from L and v through high-speed photography in each of the cases of the 50% and 70% duty cycles and from Expression (1). Table 1 shows that the pulse-modulation frequency with which the defect suppression is efficiently implemented properly conforms to the natural oscillation frequency of the molten pool at either one of the duty cycles. Thus, this proves weld defects such as porosities can efficiently be prevented by periodically varying the laser output in accordance with the frequency that r sonates with the natural oscillations of the molten pool.

TABLE 1

| Duty cycle (%) | 50 | 70 |
|---|---|---|
| Welding speed v (mm/s) | 630 | 630 |
| Molten-pool length L (mm) | 19.6 | 23.8 |
| Natural oscillation frequency f (Hz) | 16 | 13 |

Example 2

Partial penetration welding was p rformed on a steel plate SM490C which is for general welded structure by using a pulse-modulated $CO_2$ laser beam. A He gas was used as a shielding gas, and side-shielding was performed at a flow rate of 50 L/min.

A trapezoidal waveform as shown in FIG. 4 was used for the output waveform; and the peak output WP was set to 20 kW, the base output WB was set to 8 kW, and the rise time tu and the fall time td were varied. Bead-on-plate welding was performed with a 50% duty cycle. The penetration depth at this case was about 20 mm.

Weld-defect detection was performed by x-ray radiographies with radiation emitted perpendicular to a laser beam axis and a weld line from a sideface on a weld test piece. The ratio (%) of the sum of d tected defect areas to the area of molten metal is defined as a defect occurrence ratio Pr, and defect suppression effects were evaluated according to Pr.

Figure 6:
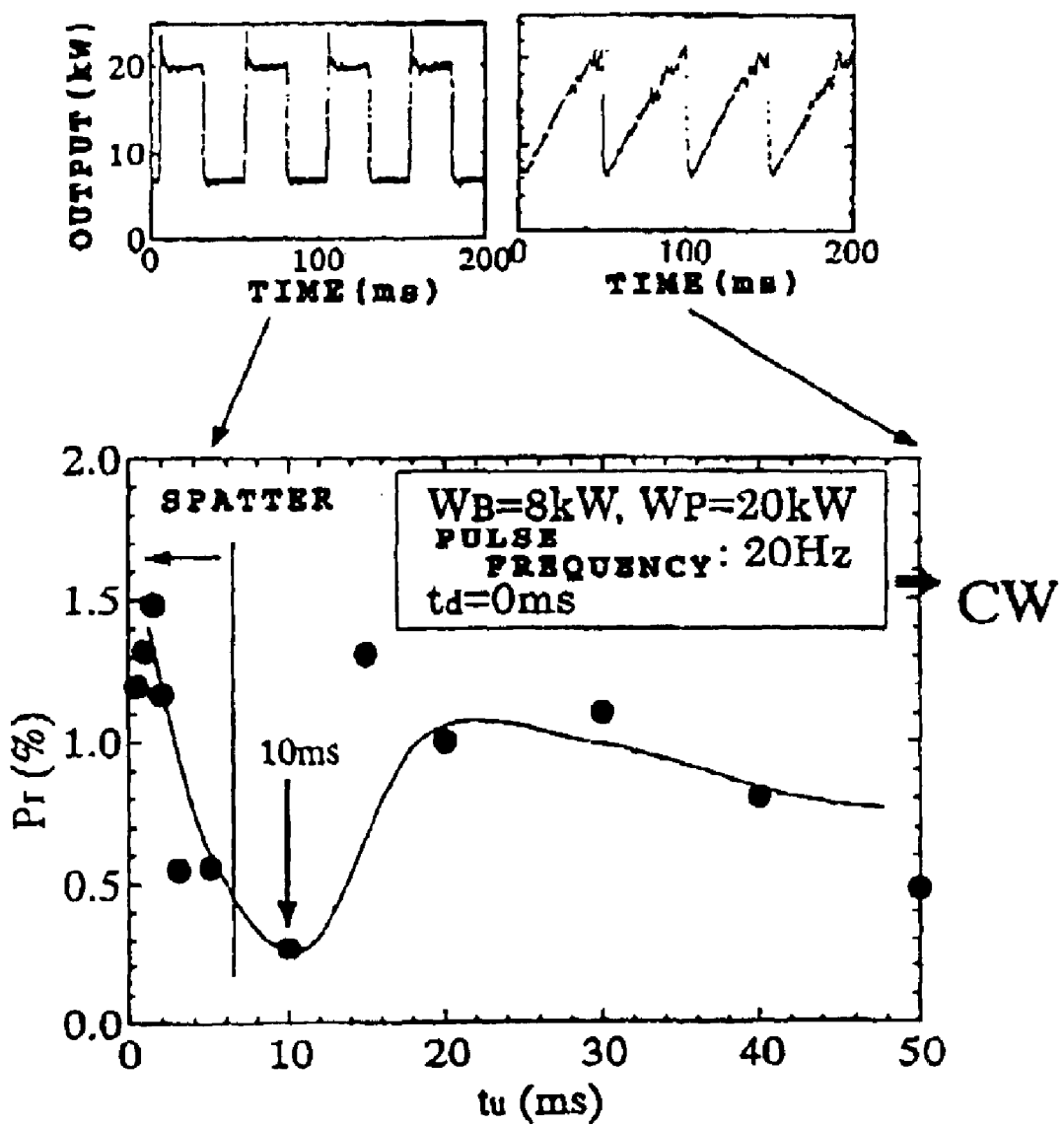
FIG. 6 is a view showing influences of a pulse-output rise time tu on the defect occurrence ratio Pr under the condition that a fall time of the pulse output is 0.

FIG. 6 shows influences of the pulse rise time tu to a defect occurrence amount under the condition in which the pulse fall time td was set to zero second (td=0 ms).

In a short time region for which the pulse rise time tu was reduced, the spatter occurrence rate was very high, and occurrence of defects such as underfills and p r situ s was concurrently made c nspicuous.

In contrast, when the pulse rise time tu was increased, occurrence of spatter as mentioned above could be suppressed. Concurrently, formation of a normal bead was enabled, and defects were most suppressed when tu=10 ms. Thus it can be known that the increase in tu is one of efficient defect-suppressing factors.

However, when tu was increased in excess of tu=10 ms, the periodical oscillation to be introduced to the molten pool was dampened, and the probability f porosity occurrence was increased again.

Pr in the drawing represents a defect occurrence ratio, which is the ratio (%) of the sum of detected defect areas to the area of molten metal.

Since it was found from the above experimented example that e defects are most suppressed when tu=10 ms, the evaluation was conducted for influences of varied pulse fall time td on the defect occurrence ratio under the condition where the pulse rise time tu is set constant at tu=10 ms.

Figure 7:
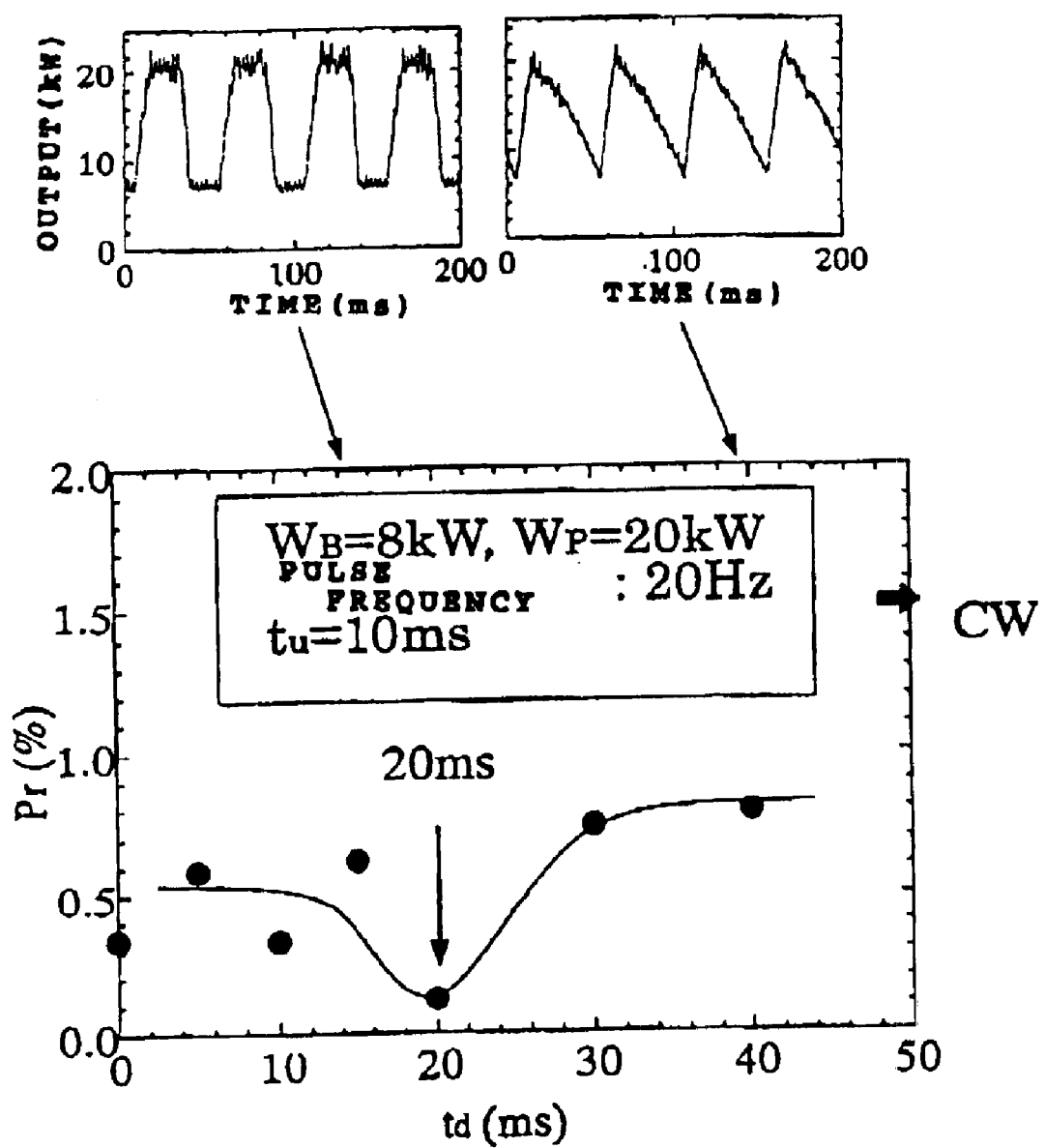
FIG. 7 is a view showing influences of a fall time td of a pulse output on the defect occurrence ratio Pr under the condition that the pulse-output rise time tu is constant at 10 ms.

FIG. 7 shows the results of the above.

FIG. 7 indicates that, with the pulse fall time td being set long, defects are most suppressed at a reduced Pr where td=20 ms. This is because when the output abruptly varies from WP to WB, molten metal around the k yhole flows into the keyhole, causing porosities to easily remain; henc the output is controlled to slowly vary to enable occurrence of defects to be prevented.

In addition, the results indicate that also the increase in the pulse fall time td is a factor that enables efficient defect prevention. Similar to the rise time tu described above, an optimal value exists for the pulse fall time td, and defects are m st suppressed when the fall time td=20 ms.

However, when the fall time td is set longer than 20 ms, the defect suppression effects are reduced again. This is attributed to the phenomenon in which the bass output time tb is reduced according to the increase in the fall time td, the laser output rises before the keyhole completely becomes small, and the amplitude of oscillation introduced to the molten pool at that time is reduced.

Figure 8:
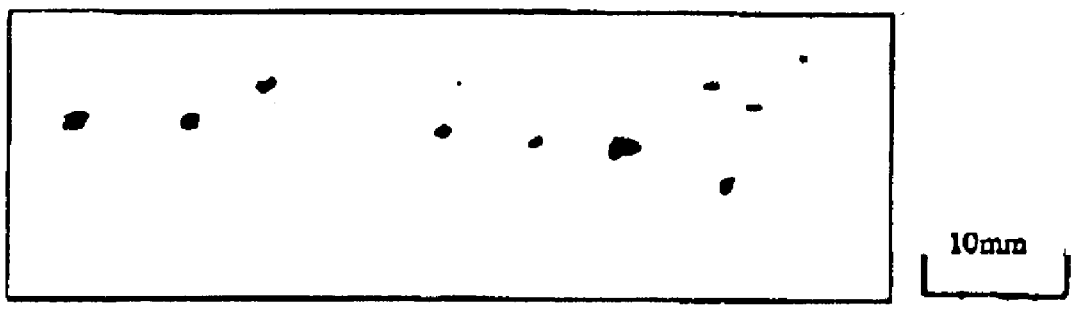
FIG. 8 show comparison views of x-ray radiographies of defect occurrence states, wherein (a) shows an x-ray radiography in CW (continuous w va) welding, and (b) shows an x-ray radiography in an optimal condition according to the embodiment.
Figure 8:
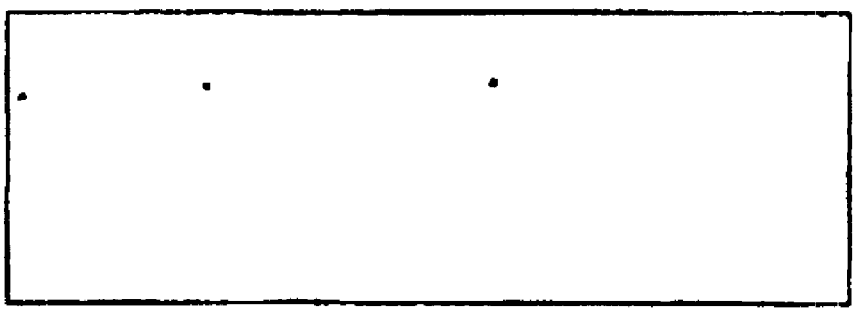

For comparison, FIG. 8 shows the results of x-ray radiographies performed for defect occurrence states in cases where CW (continuous wave) welding was performed and where pulse welding employing waveform control was performed under optimal conditions according to the present invention.

As a result of the CW (continuous wave) welding, the defect occurrence ratio was found to be Pr=1.5% in w lding with an output of 18.3 kW. Under the optimal conditions obtain d in th embodiment of the present invention, namely, under the conditions where WB=8 kW, WP=20 kW, tu=10 ms, and td=20 ms, the defect occurrence ratio was found to be Pr=0.1%.

As above, according to the present invention, the result of the welding employing the laser welding method under the optimal conditions was such that the defect occurrence ratio can be reduced to $\frac{1}{15}$ in comparison to the CW (continuous wave) welding; that is, occurrence of defects can be suppressed at a very high efficiency.

In the embodiment described above, while the result was such that the efficient defect-occurrence suppression effects can be obtained when the ratio (WB/WP) of the base output to the peak output was 0.4. However, similar effects were obtained also wh n (WB/WP) was 0.6. In this case, the rectangular pulse was most effective for the defect suppression.

INDUSTRIAL APPLICABILITY

According to the present invention, in keyhole welding using a laser processor, weld defects such as porosities, blowholes, and cracks can be efficiently prevented in a manner that introduces laser output variations with a frequency conforming to natural oscillations of a molten pool and a contr lled waveform to th reby activate th periodical flow of molten metal.

In addition, the present invention can be provided as a method that can be applied to thick-plate welding requiring a method for preventing weld defects that are particularly serious problems. Th reby, high quality thick-plate laser welding that has hitherto been difficult can be implemented, and the application fields of the laser welding can be xpected to be increased.

Furthermore, according to the present invention, high efficiency thick-plate welding is enabled, and cost reduction in a production line can be expected.

What is claimed is:

1. A laser welding method characterized in that, while performing keyhole welding by a laser whose output is pulse-modulated, the output of the laser is periodically varied with a frequency which conforms to a natural oscillation frequency of a m tal molten pool.

2. A laser welding method according to claim 1, characterized in that the welding is conducted by a $CO_2$ laser.

3. A laser welding method characterized in that, while performing keyhole welding by a laser, a pulse output of the laser is periodically varied with a frequency which conforms to a natural oscillation of a molten pool and a rise variation of a laser output is sloped.

4. A laser welding method characterized in that, while performing keyhole welding by a laser, a pulse output of the laser is periodically varied with a frequency which conforms to a natural oscillation of a molten pool and a fall variation of a laser output is sloped.

5. A laser welding method according to claim 4, characterized in that a rise variation of the laser output is also sloped.

6. A laser welding method according to claim 3, characterized in that a ratio (WB/WP) of a base output (WB) and a peak output (WP) is set to 0.6 or lower.

7. A laser welding method according to claim 4, characterized in that a ratio (WB/WP) of a base output (WB) and a peak output (WP) is set to 0.6 or lower.

8. A laser welding method according to claim 5, characterized in that a ratio (WB/WP) of a base output (WB) and a peak output (WP) is set to 0.6 or lower.

* * * * *